United States Patent Office 2,699,255
Patented Jan. 11, 1955

2,699,255

CONCENTRATION OF SYLVITE FROM SYLVINITE ORE

Earl H. Brown, Hibbing, Minn., and Tom A. Cecil, Mulberry, Fla., assignors to Minerals & Chemicals Corporation of America, a corporation of Maryland No Drawing. Application September 19, 1952,
Serial No. 310,548

1 Claim. (Cl. 209—166)

This invention relates to the concentration of sylvite (potassium chloride) from sylvinite ores (principally composed of potassium and sodium chlorides) such as are found in the Carlsbad district of New Mexico.

The invention resides in improved methods of effecting the concentration of the desired sylvite from sylvinite ores by froth-flotation, skin flotation, agglomeration tabling and other methods involving wet stratification, with the use of appropriate agents which effect separation of the sylvite from the other ore constituents.

It is known that sylvite can be recovered from a suspension of the sylvinite in a saturated solution of the soluble constituents of a sylvinite ore in accordance with well-established concentration operations by using, as a collector for the sylvite, straight chain aliphatic amines containing alkyl groups with from about 7 to 18 carbon atoms. The lower members of the series of aliphatic amines may be used either in the form of free bases or as salts formed by their combination with acids which are themselves relatively devoid of surface active properties, such as hydrochloric, nitric or acetic acid. The higher members of the series, being less soluble, are most conveniently used in the form of their more soluble salts. One such mixture of aliphatic amines which has been found to be particularly useful is sold by Armour and Company under the name "Armac T" which is understood to consist of a mixture of hexadecyl, octadecyl and octadecenyl amine acetates in the proportions of about 30%, 25% and 45% respectively. It is also known that small amounts of a frothing agent such as pine oil usually facilitate the separation of the sylvite. It has also been found desirable to remove the greater part of the insoluble so-called slimes from the sylvinite ore before subjecting it to a concentrating treatment. This desliming is conveniently done after crushing the ore but before grinding it to the size suitable for treatment; and in this way the loss of very fine potassium chloride particles formed in the fine grinding is avoided. These fine chloride particles do not interfere with the separation of the chlorides during the concentrating treatment as do the so-called primary slimes.

While a fairly pure potassium chloride concentrate can be obtained by the method mentioned, the recovery is generally low, because about one-half or more of the potassium chloride may remain in the tailings along with the sodium chloride. Attempts to increase the recovery of potassium chloride by using larger amounts of the aliphatic amine reagents generally result in lowering the grade of the concentrate to a point at which they are no longer commercially acceptable, without appreciably increasing the recovery.

The general objects of the present invention are to produce sylvite concentrates of the desired high commercial grade, with a high percentage of recovery, with economy in the use of aliphatic amine reagents of the kind mentioned, and with reliable and easily controlled plant operations. These objects are attained by the methods of the present invention which are hereinafter described.

The methods of the present invention are the result of the discovery that greatly improved results, as to grade and recovery of the desired sylvite and as to control of operations, can be obtained by the use, in conjunction with the aforesaid straight chain aliphatic amines used as collectors, of xanthates of starch or of dextrin. These xanthates need not be chemically pure compounds and are preferably the crude reaction products of caustic alkali and carbon disulfide on starch or dextrin, obtained as hereinafter described, without isolation of the pure xanthate.

COMPARATIVE TEST

For the purpose of comparison with the examples hereafter given, the following description is given of a concentration of sylvite from a sylvinite ore by the use of straight chain aliphatic amines as collectors without the use of any auxiliary agent.

A sample of sylvinite ore was crushed to minus 10 mesh and was substantially deslimed; and then the crushed ore was ground until all passed through a 35 mesh screen, the slimes having been discarded. The sample thus obtained was mixed with brine, consisting of a saturated aqueous solution of the same sylvinite ore, in a Fagergren flotation machine, and reagents were added consisting of 0.2 lb. of pine oil and 0.4 lb. of "Armac T" (previously described), both per ton of dry feed; and, after about 10 seconds of preliminary agitation, air was admitted and a floating froth was removed. This froth product was cleaned twice by reflotation in saturated brine, without any reagent addition, the froth product being removed in each case. The results were as follows:

|  | Weight, Percent | KCl, Percent | Recovery, Percent |
| --- | --- | --- | --- |
| Feed | 100.0 | 31.02 | 100.0 |
| Concentrate | 15.7 | 91.4 | 46.3 |
| 2nd Middling | 8.5 | 88.9 | 24.4 |
| 1st Middling | 8.8 | 60.9 | 17.3 |
| Tailing | 67.0 | 5.6 | 12.0 |

It will be noted that from a feed containing 31.02% KCl a concentrate was obtained containing 91.4% KCl, but that the recovery was only 46.3% of the KCl in the feed.

Example I

The procedure in this example was exactly the same as in the test just described, except that 0.8 lb. of crude starch xanthate (made as hereafter described), per ton of dry feed, was used in addition to the "Armac T" and pine oil. The results were as follows:

|  | Weight, Percent | KCl, Percent | Recovery, Percent |
| --- | --- | --- | --- |
| Feed | 100.0 | 29.91 | 100.0 |
| Concentrate | 28.3 | 94.5 | 89.4 |
| 2nd Middling | 1.1 | 56.2 | 2.1 |
| 1st Middling | 3.2 | 16.5 | 1.8 |
| Tailing | 67.4 | 3.0 | 6.7 |

It will be seen that, in comparison with the previously described test, the grade of the KCl concentrate was improved by 3.1%, and the recovery was improved by 43.1%.

The crude starch xanthate used in this example was prepared in the following manner: To 20.1 grams of a commercial corn-starch 3.6 grams of sodium hydroxide was added as a 1% solution in an open beaker with constant stirring. After a few minutes, 1.3 grams of carbon disulfide was added and the stirring was continued for about 2 hours. This reaction product containing sodium starch xanthate was used in making a 2.5% aqueous solution, based on the weight of the chemicals entering the reaction.

Example II

In this example, a purified starch xanthate (produced in the manner hereafter described) was employed. The operation was carried out in the same manner as in the comparative test first described, except that the purified starch xanthate in the amount of 0.5 lb. per ton of dry feed was used in addition to the 0.2 lb. of pine oil and 0.4 lb. of "Armac T." The results were as follows:

|  | Weight, Percent | KCl, Percent | Recovery, Percent |
|---|---|---|---|
| Feed | 100.0 | 29.01 | 100.0 |
| Concentrate | 25.4 | 94.5 | 82.7 |
| 2nd Middling | 2.3 | 75.5 | 6.0 |
| 1st Middling | 4.2 | 21.2 | 3.1 |
| Tailing | 68.1 | 3.5 | 8.2 |

Comparison of these results with those of Example I shows that the grade of sylvite concentrate was about the same in each case although the recovery in Example II where less reagent was used was lower. It appears, therefore, that there is no particular advantage in using the purified reagent.

The purified starch xanthate used in this example was made in the following manner: To 10.8 grams of potato starch, 25 grams of carbon disulfide were added to make a thin slurry. To this slurry in a stoppered bottle was added 50 cubic centimeters of a 16% sodium hydroxide solution, and the bottle was rotated at room temperature for about 5 hours. This produced an orange-colored gummy mass which was removed from the bottle; and the large excess of carbon disulfide was removed by decantation and finally by suction. The product thus obtained was dissolved in water and the starch xanthate was precipitated by adding cold denatured alcohol to the solution. The precipitate was washed with alcohol and then with ether and after drying at room temperature, was broken up in a mortar to a fine yellow-colored powder. This powder was the purified starch xanthate used in this example.

*Example III*

Although it has been found advantageous to substantially deslime the sylvinite ore before flotation, as hereinbefore mentioned, it has been found possible by the use of a crude xanthate of starch, along with the aforesaid straight chain aliphatic amines employed as collectors, to obtain a good recovery of high grade potassium chloride without removing any of the slimes from the crude ore. This is shown by this example.

A charge of sylvinite ore was crushed to minus 10 mesh and was then ground until it passed through a 35 mesh screen, without removing any slimes either before or after grinding. The feed thus obtained was subjected to froth-flotation treatment in the manner described in Example I using as reagents 0.2 lb. of pine oil, 0.8 lb. of "Armac T" and 1.25 lbs. of crude starch xanthate which was prepared as described in connection with Example I, all per ton of dry ore. The flotation froth was cleaned twice without the addition of any reagent. The results were as follows:

|  | Weight, Percent | KCl, Percent | Recovery, Percent |
|---|---|---|---|
| Feed | 100.0 | 28.71 | 100.0 |
| Concentrate | 27.2 | 95.0 | 90.0 |
| 2nd Middling | 0.8 | 33.6 | 0.9 |
| 1st Middling | 4.3 | 9.9 | 1.5 |
| Tailing | 67.7 | 3.2 | 7.6 |

It will be noted that although it was found necessary to use a larger quantity of the aliphatic amine reagent than in Example I the test resulted in a good grade of concentrate and a good recovery. When no starch xanthate was used in an otherwise identical test, the grade of concentrate was only 89.7% KCl and the recovery was only 51.0% of the KCl in the feed.

*Example IV*

This example shows the effect of the use of a crude dextrin xanthate, along with the straight chain aliphatic amines hereinbefore mentioned.

The dextrin xanthate was made in the following way: 10.8 grams of commercial dextrin was dissolved in 180 cc. of 2% caustic soda solution, to which was added 7.6 grams of carbon disulfide; and the mixture was then agitated mechanically in a closed vessel for about three hours. The mixture was then poured into methyl alcohol, and the precipated dextrin xanthate was washed several times with methyl alcohol, and finally washed with ether and dried.

This test was carried out in exactly the same way as Example I except that the reagents used were 0.40 lb. "Armac T," 1.25 lbs. dextrin xanthate, and 0.20 lb. pine oil, all per ton of feed. The results were as follows:

|  | Weight, Percent | KCl, Percent | Recovery, Percent |
|---|---|---|---|
| Feed | 100.0 | 28.06 | 100.0 |
| Concentrate | 25.7 | 95.7 | 87.7 |
| 2nd Middling | 0.8 | 67.7 | 1.6 |
| 1st Middling | 2.8 | 22.3 | 2.2 |
| Tailing | 70.7 | 3.4 | 8.5 |

A similar test, using the same quantity of reagents, was made using a dextrin xanthate prepared from purified dextrin with the following results:

|  | Weight, Percent | KCl, Percent | Recovery, Percent |
|---|---|---|---|
| Feed | 100.0 | 28.21 | 100.0 |
| Concentrate | 25.6 | 95.9 | 87.0 |
| 2nd Middling | 0.8 | 77.0 | 2.2 |
| 1st Middling | 2.8 | 27.6 | 2.7 |
| Tailing | 70.8 | 3.2 | 8.1 |

It will be observed that the results of using a dextrin xanthate produced from commercial dextrin and a dextrin xanthate produced from purified dextrin were about the same.

The examples given illustrate the successful concentration of sylvite from sylvinite ores employing as the collector straight chain aliphatic amines containing alkyl groups with from about 7 to 18 carbon atoms, in conjunction with cooperating agents consisting of starch and dextrin xanthates.

What is claimed is:

The improvement in the method of concentrating sylvite from a sylvinite ore in a pulp formed with a saturated aqueous solution of the soluble ore constitutents and conditioned with a collector selected from the class consisting of aliphatic amines containing a straight chain alkyl group having from 8 to 18 carbon atoms and their salts with water soluble acids, which results from distributing in said pulp a useful amount of crude starch xanthate.

References Cited in the file of this patent

UNITED STATES PATENTS

| 2,288,497 | Tartaron et al. | June 30, 1942 |
| 2,364,520 | Cole et al. | Dec. 5, 1944 |